(12) United States Patent
Pudney et al.

(10) Patent No.: US 10,349,315 B2
(45) Date of Patent: Jul. 9, 2019

(54) OPERATING A COMMUNICATIONS DEVICE IN A MOBILE COMMUNICATIONS NETWORK

(71) Applicant: VODAFONE GMBH, Duesseldorf (DE)

(72) Inventors: Chris Pudney, Pennwood (GB); Alexej Kulakov, Deusseldorf (DE); Juergen Caldenhoven, Duesseldorf (DE)

(73) Assignee: VODAFONE GMBH, Duesseldorf (DE)

( * ) Notice: Subject to any disclaimer, the term of this patent is extended or adjusted under 35 U.S.C. 154(b) by 0 days.

(21) Appl. No.: 15/409,252

(22) Filed: Jan. 18, 2017

(65) Prior Publication Data

US 2017/0208510 A1   Jul. 20, 2017

(30) Foreign Application Priority Data

Jan. 18, 2016   (EP) .................................... 16151700

(51) Int. Cl.
| | | |
|---|---|---|
| *H04W 36/22* | (2009.01) | |
| *H04W 36/00* | (2009.01) | |
| *H04W 4/70* | (2018.01) | |
| *H04L 29/08* | (2006.01) | |
| *H04W 8/22* | (2009.01) | |
| *H04W 36/14* | (2009.01) | |

(Continued)

(52) U.S. Cl.
CPC ......... *H04W 36/0022* (2013.01); *H04L 67/12* (2013.01); *H04W 4/70* (2018.02); *H04W 8/22* (2013.01); *H04W 36/14* (2013.01); *H04W 48/17* (2013.01); *H04W 60/00* (2013.01)

(58) Field of Classification Search
CPC .......................... H04W 12/08; H04W 36/0022
See application file for complete search history.

(56) References Cited

U.S. PATENT DOCUMENTS

2014/0086177 A1* 3/2014 Adjakple .............. H04W 12/08
370/329

OTHER PUBLICATIONS

3GPP TSG-RAN WG2 #87 Tdoc R2-143332 Dresden, Germany Aug. 18-22, 2014.*

(Continued)

*Primary Examiner* — Myron Wyche
(74) *Attorney, Agent, or Firm* — Grossman, Tucker, Perreault & Pfleger, PLLC

(57) ABSTRACT

A method is provided for operating a communications device (UE) in a mobile communications network including one or more network elements (eNodeB, MME; CIoT-BS, C-SGN), which are especially for providing a wireless access interface for the communications device (UE), especially according to LTE or CIoT. The communications device (UE), during an attach procedure, transmits an information element regarding radio related capabilities of the communications device (UE) and/or regarding core network capabilities of the communications device (UE) to a network element (eNodeB; CIoT-BS) of the mobile communications network providing a wireless access interface for the communications device (UE). A method is also provided for operating a communications device (UE) in a mobile communications network including one or more network elements (eNodeB, MME; CIoT-BS, C-SGN). A mobile communications system is also provided to perform the methods.

14 Claims, 5 Drawing Sheets

(51) Int. Cl.
  *H04W 60/00* (2009.01)
  *H04W 48/00* (2009.01)

(56) References Cited

OTHER PUBLICATIONS

3GPP TSG0RAN WG2 #87, Tdoc R2-143332, Dreseden Germany, Aug. 18-22, 2014.*
NTT DOCOMO, "Key Issue: Selection of CIoT CN", SA WG2 Meeting #110, Dubrovnik, Croatia, Jul. 6-10, 2015, 4 pgs.
Ericsson, "TBS Limitation and Indication of Category for Low Complexity UEs", 3GPP TSG-RAN WG2 #87, Dresden, Germany, Aug. 18-22, 2014, 6 pgs.
Qualcomm Europe, "Framework for UE Capability Handling in LTE", 3GPP TSG-RAN WG 2 Meeting #57-bis, St. Julians, Malta, Mar. 26-30, 2007, 7 pgs.
3GPP TR 23.720, V1.2.0, "3rd Generation Partnership Project; Technical Specification Group Services and System Aspects; Architecture Enhancements for Cellular Internet or Things", Release 13, Nov. 2015, Valbonne, France.
3GPP TR 23.401, V13.5.0, "3rd Generation Partnership Project; Technical Specification Group Services and System Aspects; General Packet Radio Service (GPRS) Enhancements for Evolved Universal Terrestrial Radio Access Network", Release 13, Dec. 2015, Valbonne, France.
3GPP TS 36.300, V13.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN)", Release 13, Sep. 2015, Valbonne, France.
3GPP TS 36.331, V13.0.0, "3rd Generation Partnership Project; Technical Specification Group Radio Access Network; Evolved Universal Terrestrial Radio Access (E-UTRA); Radio Resource Control (RRC)", Release 13, Dec. 2015, Valbonne, France.
3GPP TS 36.413, V13.1.0, "3rd Generation Partnership Project; Technical Specification Group Radio Access Network; Evolved Universal Terrestrial Radio Access (E-UTRA); S1 Application Protocol (S1AP)", Release 13, Dec. 2015, Valbonne, France.

\* cited by examiner (state of the art)

(state of the art)

R/R/E/LCID sub-header

OPERATING A COMMUNICATIONS DEVICE IN A MOBILE COMMUNICATIONS NETWORK

CROSS REFERENCE TO RELATED APPLICATIONS

This application claims priority to European Patent Application No. 16 151 700.8 filed on Jan. 18, 2016, the disclosure of which is incorporated herein by reference.

TECHNICAL FIELD

The present invention relates to methods of operating a communications device (so called UE (UE: User Equipment)), especially including communication devices (UE) for NB-IoT respectively CIoT, like M2M devices, in a mobile communications network including one or more network elements (for example eNodeB, MME or CIoT-BS, C-SGN), which are especially for providing a wireless access interface for the communications device (UE), especially according to LTE (LTE: Long Term Evolution) or CIoT (CIoT: Cellular Internet of Things; IoT: Internet of Things).

The present invention further relates to a mobile communications system for operating a communications device (UE), especially including communication devices (UE) for NB-IoT respectively CIoT, like M2M devices, in a mobile communications network including one or more network elements (for example eNodeB, MME; CIoT-BS, C-SGN), which are especially for providing a wireless access interface for the communications device (UE), especially according to LTE or CIoT, whereby the communications device (UE) and a network element (for example eNodeB; CIoT-BS) of the mobile communications network providing a wireless access interface for the communications device (UE) are adapted to perform the steps of a method according to the present invention. Further objects of the present invention are a communication device (UE) and a network element (for example eNodeB; CIoT-BS) which are adapted to perform the steps of a method according to the present invention.

BACKGROUND

3GPP networks are beginning to support communications devices and/or customers with very different and/or special respectively specific characteristics, such as M2M (M2M: Machine to Machine) devices, etc. These classes of communications devices and/or customers may have different requirements from the network elements (for example eNodeB (eNB), MME, CIoT-BS, C-SGN) of a mobile communications network in terms of optional feature support, traffic characteristic support, availability, congestion management, ratio of signaling to user plane traffic, etc. Such requirements relates to radio related capabilities of the communications device (UE) and/or regarding core network capabilities of the communications device (UE), which are for example defined in 3GPP TS 36.331, Chapter 6.3.6 "Other information elements", "UE-EUTRA-Capability" and relate for example to PDCP parameters, RLC parameters, RF parameters etc. It is supposed, that the classes of communications devices and/or customers will continue to increase. One cost effective mechanism for operators to support these different classes of communications devices and customers is to create separate dedicated core networks consisting of specialized core network elements that are designed and deployed to meet the requirements of these different communications devices and/or customers. It is cost-effective as the network availability or redundancy requirements may be easier met with different hardware and/or software than the existing network elements of a mobile communications network. Also, especially creating separate core network elements enables independent scaling or specific feature provisioning for specific communications devices and/or customers or traffic types and isolating specific communications devices and/or customers and traffic from each other.

In a mobile communications network according to LTE the mechanism to transport information regarding radio related capabilities of the communications device (UE) and/or regarding core network capabilities of the communications device (UE) is designed in a way that during an attach procedure, especially with RRC (RRC: Radio Resource Control), and the first TAU procedure (TAU: Tracking Area Update) to LTE the mobile communications network retrieves the UE capabilities from the communications device (UE), especially according to 3GPP TS 23.401, 3GPP TS 36.300, 3GPP TS 36.331 respectively 3GPP TS 36.413, which are herewith cited by reference, especially for purposes of supporting disclosure and the scope of the present invention. For subsequent RRC connections, MME (MME: Mobility Management Entity) provides these capabilities to the eNodeB (eNB) within an INITIAL CONTEXT SETUP message over so called S1 when the default bearer is setup. The mechanism is for example shown in 3GPP 36.300, chapter 18 "UE capabilities" (also compare enclosed FIG. 1).

For a mobile communication network according to CIoT the core network elements (for example C-SGN) has to support a very large number of IoT communication devices which have very different traffic characteristics than for example communication devices that the EPC respectively EPS is currently supporting. The message sizes and traffic load in CIoT is much smaller (for example 20 bytes to 200 bytes), single/limited transfers (for example 1 to 2 packets per transmission/reception) and sent infrequently (for example several times a day) than the traffic model assumed for existing EPC traffic. Also requirements for supporting respectively not-supporting seamless mobility are different.

Thus the core network respectively core network elements of a mobile communication network according to CIoT can have an simplified and different architecture from the existing EPC architecture according to LTE to cope with such communication devices (UE), especially including communication devices (UE) for NB-IoT respectively CIoT, like M2M devices respectively MTC devices and/or the like. The two options for developing the CIoT core network are to have the existing EPC support S1 interface while not modifying the existing EPC architecture, nodes and/or interfaces, such as MME, SGW, PGW, SH, S5, SIO, etc., or to have a modified core-network architecture for CIoT and have 51 as interface between the CIoT core network and the CIoT RAN. The CIoT core network than only serves communication devices that attach to CIoT RAN.

For CIoT NB-IoT systems (NB-IoT: Narrow Band IoT) are designed within 3GPP, which especially intend to provide means for a much more efficient way to send respectively receive small amount of very infrequent data. 3GPP TR 23.720, which is herewith cited by reference, especially for purposes of supporting disclosure and the scope of the present invention, shows for example within Solution 2 one agreed way of doing it (compare for example chapter 6.2 of 3GPP TR 23.720). The enclosed FIG. 2 shows the corresponding message flow for mobile originated small data transmission according to 3GPP TR 23-720 Solution 2. As it can be seen from FIG. 2, after the attach procedure, which is an RRC connection establishment and from RRC perspective also comprises three messages (in FIG. 2 it is shown summarized as one step "0. Attach"), namely RRC connection request, RRC connection setup and RRC connection setup complete, there is no INITIAL CONTEXT SETUP message over S1 or a similar mechanism, with which the capabilities of the communications devices, especially radio related capabilities of a communications device (UE) and/or core network capabilities of a communications device (UE) respectively required and/or supported by a communications device (UE), could be transferred. Furthermore the connection for small data delivery (Message 6 "Small Data Delivery, RRC connection release" in FIG. 2) might be released just after first downlink NAS message (Message 5 "Downlink NAS Message (NAS PDU)" in FIG. 2).

In spite of this there is a need for a mechanism which allows operating a communications device (UE) in a mobile communications network, especially according to LTE or CIoT, whereby the capabilities of the communications device (UE), especially radio related capabilities of the communications device (UE) and/or core network capabilities of the communications device (UE) are as fast as possible available and usable at a network element, especially eNodeB (eNB) and/or CIoT-BS, of the mobile communications network providing a wireless access interface for the communications device (UE).

SUMMARY

As a technical solution the present invention suggests a method of operating a communications device (UE), especially including communication devices (UE) for NB-IoT respectively CIoT, like M2M devices in a mobile communications network, especially according to LTE or CIoT, whereby the communications device (UE) during an attach procedure transmits an information element regarding radio related capabilities of the communications device (UE) and/or regarding core network capabilities of the communications device (UE) to a network element, preferably eNodeB and/or CIoT-BS, of the mobile communications network providing a wireless access interface for the communications device (UE).

The information element regarding radio related capabilities of the communications device (UE) and/or regarding core network capabilities of the communications device (UE) is advantageously transferred to the network element (eNodeB; CIoT-BS) of the mobile communications network with a RRC connection request, preferably within MAC header used for RRC connection request transport.

It is advantageously provided, that the information element regarding radio related capabilities of the communications device (UE) and/or regarding core network capabilities of the communications device (UE) is inserted within the RRC connection request by the communications device (UE), preferably within MAC header used for RRC connection request transport.

Further it is advantageously provided, that the information element regarding radio related capabilities of the communications device (UE) and/or regarding core network capabilities of the communications device (UE) is entered within reserved values of the LCID of the RRC connection request.

Thus the communications device (UE) according to the present invention provides the capability related information element at the first possibility while establishing the RRC connection. As a result the capabilities of the communications device (UE), especially radio related capabilities of the communications device (UE) and/or core network capabilities of the communications device (UE) are as fast as possible available, advantageously before RRC connection is established and data can be transmitted, and usable at a network element, especially eNodeB (eNB) and/or CIoT-BS, of the mobile communications network providing a wireless access interface for the communications device (UE). The establishment of the RRC connection might be done in order to transport attach request, TAU request, and/or any other NAS message, but also to transmit data or both. In order to do it, the communications device (UE) inserts or includes at least some of the capabilities into the MAC header, preferably by using reserved LCID values and/or R fields of the header, which is used to transport RRC connection request message. It has to be noted, that it is not the RRC connection request message itself, but the header of the layer below. Advantageously the network element (for example eNodeB; CIoT-BS) knows immediately that the communications device (US) for example is a NB-IoT/CIoT device with a certain characteristic and can especially assign resources for follow up messages like "RRC connection setup complete", for admission control and/or for choice respectively selection of a core network element (for example eNodeB; CIoT-BS) in an improved way.

In a further embodiment of the present invention the information element regarding radio related capabilities of the communications device (UE) and/or regarding core network capabilities of the communications device (UE) is created by the communications device (UE) out of the parameters of the capabilities of the communications device (UE), especially UE-EUTRA capabilities according to 3GPP TS 36.331, chapter 6.3.6, with PDCP parameters, RLC parameters, RF parameters and/or the like according to 3GPP TS 36.306, which is herewith cited by reference, especially for purposes of supporting disclosure and the scope of the present invention, or like other future respectively new NB-IoT-specific parameters, like for example so called single tone. For this the communication device (UE) preferably comprises a logic respectively logic module or algorithm.

As a technical solution the present invention further suggests a method of operating a communications device (UE), especially including communication devices (UE) for NB-IoT respectively CIoT, like M2M devices in a mobile communications network, especially according to LTE or CIoT, whereby a network element, preferably eNodeB and/or CIoT-BS, of the mobile communications network providing a wireless access interface for the communications device (UE) during an attach procedure receives an information element regarding radio related capabilities of the communications device (UE) and/or regarding core network capabilities of the communications device (UE) and whereby the network element (eNodeB; CIoT-BS) of the mobile communications network is able to use the received information element regarding radio related capabilities of the communications device (UE) and/or regarding core network capabilities of the communications device (UE) itself, preferably directly, for selecting a core network node, preferably MME and/or C-SGN, of the mobile communications network, especially in such a way that for such a selection of a core network node (MME; C-SGN) of the mobile communications network no further communication between the network element (eNodeB; CIoT-BS) of the mobile communications network and the communications device (UE) and/or a core network node (MME; C-SGN) of the mobile communications network is needed.

The information element regarding radio related capabilities of the communications device (UE) and/or regarding core network capabilities of the communications device (UE) is advantageously received by the network element (eNodeB; CIoT-BS) of the mobile communications network with a RRC connection request, preferably within MAC header used for RRC connection request transport.

It is advantageously provided, that the information element regarding radio related capabilities of the communications device (UE) and/or regarding core network capabilities of the communications device (UE) is contained within the received RRC connection request, preferably within MAC header used for RRC connection request transport.

Further it is advantageously provided, that the information element regarding radio related capabilities of the communications device (UE) and/or regarding core network capabilities of the communications device (UE) is extracted by the network element (eNodeB; CIoT-BS) of the mobile communications network from the received RRC connection request, preferably from the received MAC header used for RRC connection request transport, preferably out of reserved values of the LCID of the RRC connection request.

As stated above the capability related information element is thus provides at the first possibility while establishing the RRC connection. As a result the capabilities of the communications device (UE), especially radio related capabilities of the communications device (UE) and/or core network capabilities of the communications device (UE) are as fast as possible available, advantageously before RRC connection is established and data can be transmitted, and usable at a network element, especially eNodeB (eNB) and/or CIoT-BS, of the mobile communications network providing a wireless access interface for the communications device (UE). The establishment of the RRC connection might be done in order to transport attach request, TAU request, and/or any other NAS message, but also to transmit data or both. In order to do it, the communications device (UE) inserts or includes at least some of the capabilities into the MAC header, preferably by using reserved LCID values and/or R fields of the header, which is used to transport RRC connection request message. It has to be noted, that it is not the RRC connection request message itself, but the header of the layer below. Advantageously the network element (for example eNodeB; CIoT-BS) knows immediately that the communications device (UE) for example is a NB-IoT/CIoT device with a certain characteristic and can especially assign resources for follow up messages like "RRC connection setup complete", for admission control and/or for choice respectively selection of a core network element (for example eNodeB; CIoT-BS) in an improved way.

In a further embodiment of the present invention the information element regarding radio related capabilities of the communications device (UE) and/or regarding core network capabilities of the communications device (UE) is used by the network element (for example eNodeB; CIoT-BS) of the mobile communications network to determine on side of the network element (eNodeB; CIoT-BS) the parameters of the capabilities of the communications device (UE), especially UE-EUTRA capabilities according to 3GPP TS 36.331, chapter 6.3.6, with PDCP parameters, RLC parameters, RF parameters and/or the like according to 3GPP TS 36.306 or like other future respectively new NB-IoT-specific parameters, like for example so called single tone. For this the network element (for example eNodeB; CIoT-BS), preferably with a logic respectively logic module or algorithm and/or a database respectively means for storage such information respectively data.

Object of the present invention is further a mobile communications system for operating a communications device (UE) in a mobile communications network including one or more network elements, preferably eNodeB, MME respectively CIoT-BS, C-SGN, which are especially for providing a wireless access interface for the communications device (UE), especially according to LTE or CIoT, whereby the communications device (UE) is adapted to perform the steps of a method of a communications device (UE) according to the present invention and whereby a network element, preferably eNodeB respectively CIoT-BS, of the mobile communications network providing a wireless access interface for the communications device (UE) is adapted to perform the steps of a method of a network element (eNodeB; CIot-BS) according to the present invention.

Object of the present invention is further a communications device (UE) for being operated in a in a mobile communications network, especially according to LTE or CIoT, which communications device (UE) is adapted to perform the steps of a method of a communications device (UE) according to the present invention, especially with a mobile communications system according to the present invention, and/or comprises means for performing the steps of a method of a communications device (UE) according to the present invention, especially with a mobile communications system according to the present invention.

Object of the present invention is further a mobile communications network including one or more network elements, preferably eNodeB, MME, CIoT-BS and/or C-SGN, which are especially for providing a wireless access interface for a communications device (UE), especially according to LTE or CIoT, whereby a network element, preferably eNodeB respectively CIoT-BS, of the mobile communications network providing a wireless access interface for the communications device (UE) is adapted to perform the steps of a method of a network element (eNodeB; CIoT-BS) according to the present invention, especially with a mobile communications system according to the present invention, and/or comprises means for performing the steps of a method of a network element (eNodeB; CIoT-BS) according to the present invention, especially with a mobile communications system according to the present invention and/or a communications device (UE) according to the present invention.

Object of the present invention is further a network element, preferably eNodeB respectively CIoT-BS, of a mobile communications network providing a wireless access interface for a communications device (UE), especially according to LTE or CIoT, which is adapted to perform the steps of a method of a network element (eNodeB; CIoT-BS) according to the present invention, especially with a mobile communications system according to the present invention, and/or comprises means for performing the steps of a method of a network element (eNodeB; CIoT-BS) according to the present invention, especially with a mobile communications system according to the present invention, a communications device (UE) according to the present invention and/or a mobile communications network according to the present invention.

BRIEF DESCRIPTION OF THE DRAWINGS

Further details, characteristics and advantages of the present invention are explained in the following in more detail based on the description of the exemplary embodiments shown in the figures of the drawing. In these figures.

DETAILED DESCRIPTION

Figure 1:
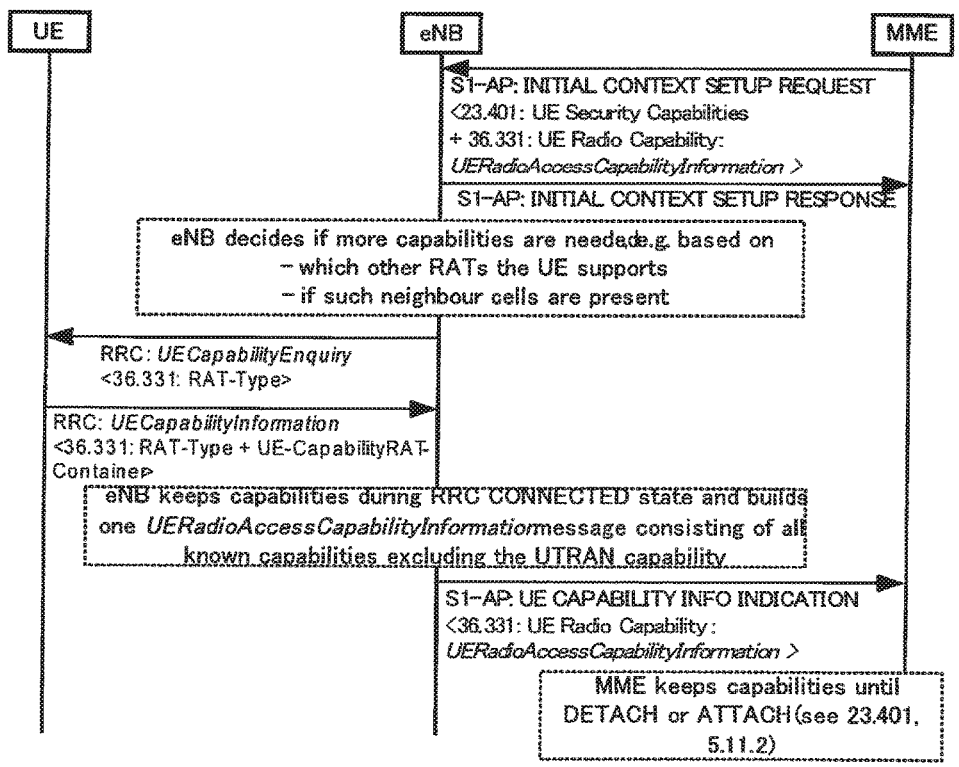
FIG. 1 shows a message flow diagram of Initial UE Capability Handling according to 3GPP TS 36.300, chapter 18 "UE Capabilities" (state of the art)

FIG. 1 shows the message flow diagram of Initial UE Capability Handling according to 3GPP TS 36.300 chapter 18 "UE Capabilities" (state of the art), which is done after an RRC connection establishment, comprising a RRC connection request message, during an attach procedure, especially with RRC (RRC: Radio Resource Control), and the first TAU procedure (TAU: Tracking Area Update) to LTE, which is not shown in FIG. 1. The mobile communications network retrieves the UE capabilities from the communications device (UE), especially according to 3GPP TS 23.401, 3GPP TS 36.300, 3GPP TS 36.331 respectively 3GPP TS 36.413, which are herewith cited by reference, especially for purposes of supporting disclosure and the scope of the present invention. For subsequent RRC connections, MME (MME: Mobility Management Entity) provides these capabilities to the eNodeB (eNB) within an INITIAL CONTEXT SETUP message over S1 when the default bearer is setup. The mechanism is for example shown in 3GPP 36.300, chapter 18 "UE capabilities". For sending the UE capabilities to the eNodeB (eNB) according to 3GPP TS 36.331 a so called "UERadioAccessCapabilityInformation" message is used (compare 3GPP TS 36.331, chapter 10.2.2). When the UE-EUTRA capabilities are known in the eNodeB (eNB), the communication device (UE) respectively the connection of the communication device (UE) to the core network is routed with a so called "UE Capability Info Indication" (compare 3GPP 36.413, chapter 9.1.10) to an appropriate core network element and stored there. If the communications device (UE) now went to so called Idle Mode and then again went to RRC connected state, the UE-EUTRA capabilities are downloaded from the core network, for example MME, to the eNodeB (eNB) within "Initial Context Setup" (compare 3GPP 36.413, chapter 9.1.4.1), since the UE-EUTRA capabilities are already stored within the core network and thus the "UE Capability Info Indication" (compare 3GPP 36.413, chapter 9.1.10) needs not to be repeated.

Figure 2:
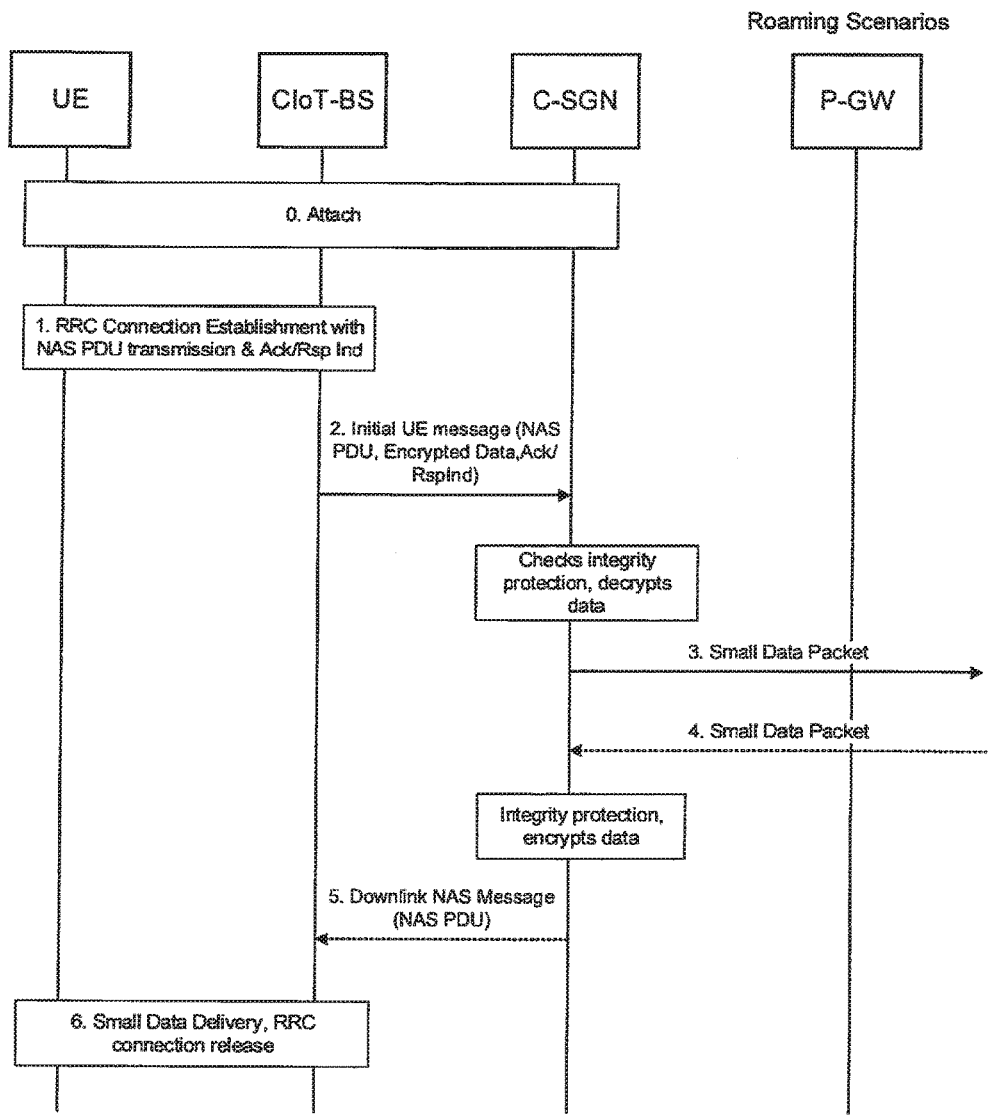
FIG. 2 shows a message flow diagram for mobile originated small data transmission in CIoT according to 3GPP TR 23.720 (state of the art)

FIG. 2 shows the message flow for mobile originated small data transmission in CIoT according to 3GPP TR 23.720, especially Solution 2. After the attach procedure, which is an RRC connection establishment and from RRC perspective also comprises three messages (in FIG. 2 it is shown summarized as one step "0. Attach"), namely RRC connection request, RRC connection setup and RRC connection setup complete, there is no INITIAL CONTEXT SETUP message over S1 or a similar mechanism, with which the capabilities of the communications devices, especially radio related capabilities of a communications device (UE) and/or core network capabilities of a communications device (UE) respectively required and/or supported by a communications device (UE), could be transferred to the core network element CIoT-BS. The connection for small data delivery (Message 6 "Small Data Delivery, RRC connection release" in FIG. 2) is released only after first downlink NAS message (Message 5 "Downlink NAS Message (NAS PDU)" in FIG. 2).

Figure 3:
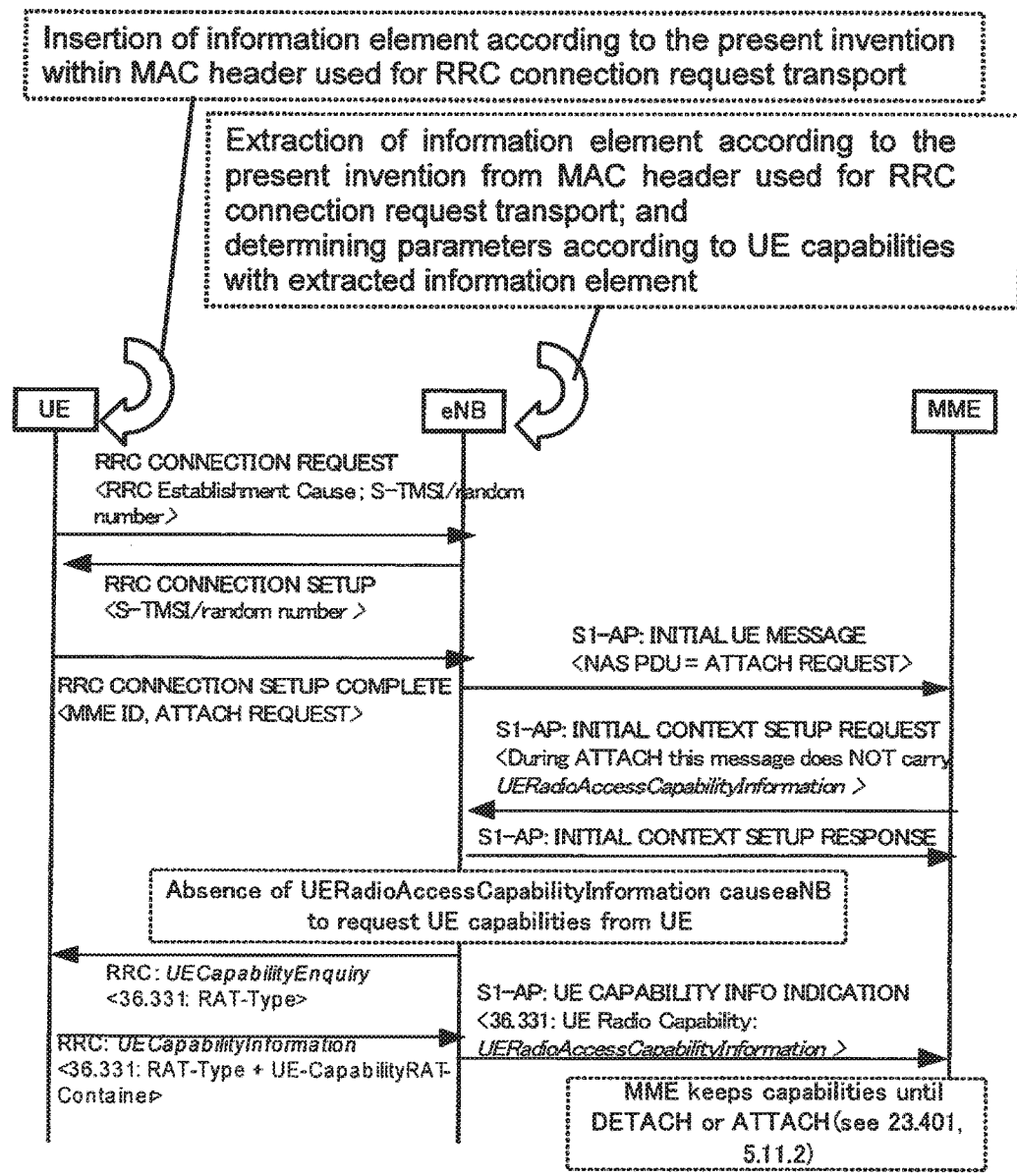
FIG. 3 shows a message flow diagram for handling the capabilities of a communications device (UE) according to a first embodiment of the present invention.

FIG. 3 shows a message flow diagram for handling the capabilities of a communications device (UE) according to a first embodiment of the present invention, which is compared with FIG. 1 modified in such a way, that the communications device (UE) during an attach procedure transmits an information element regarding radio related capabilities of the communications device (UE) and/or regarding core network capabilities of the communications device (UE) to the eNodeB (eNB) of the mobile communications network, which is according to the present invention a network element providing a wireless access interface for the communications device (UE). The information element is transferred to the eNodeB (eNB) of the mobile communications network with a RRC connection request, whereby the information element is inserted within the RRC connection request by the communications device (UE), by entering the information element within reserved values of the LCID of the RRC connection request.

The creation respectively generation of the information element regarding radio related capabilities of the communications device (UE) and/or regarding core network capabilities of the communications device (UE) is preferably done by the communications device (UE) out of the parameters of the capabilities of the communications device (UE), especially UE-EUTRA capabilities according to 3GPP TS 36.331, chapter 6.3.6, with PDCP parameters, RLC parameters, RF parameters and/or the like according to 3GPP TS 36.306 or by any new parameters which might be included into the existing parameter categories as listed above (e.g. Multi Tone/Single Tone Support, Support of different ways of Data transport within CIoT architecture (especially Solution/Option 2 or Solution/Option 18 according to 3GPP TR 23.720)). For this the communication device (UE) preferably comprises a logic respectively logic module or algorithm.

Thus the capabilities of the communications device (UE), especially radio related capabilities of the communications device (UE) and/or core network capabilities of the communications device (UE) are as fast as possible available and usable at the eNodeB (eNB) providing a wireless access interface for the communications device (UE) to the mobile communications network. This advantageously provides the mobile communications network, especially the eNodeB, a possibility to assign resources, execute admission control and/or for choice respectively selection of a core network element (for example eNodeB) in an improved way.

Figure 5:
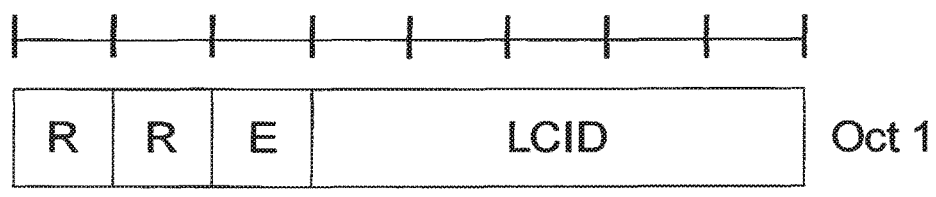
FIG. 5 shows a header for RCC CONNECTION REQUEST according to 3GPP TS 36.321.

The establishment of the connection includes from RRC perspective three messages:
RRC CONNECTION REQUEST
RRC CONNECTION SETUP
RRC CONNECTION SETUP COMPLETE RRC CONNECTION REQUEST includes 48 bits of information. 40 bits are used for identification of the communications device (UE), like TMSI and 8 bits for cause values. RRC Connection requests uses MAC layer to be transported, so that a header of 1 octet is added as for example shown in 3GPP TS 36.321, chapter 6.1.2 (compare FIG. 5).

Singe felds are defined as follow in 3GPP TS 36.321:

LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 [12] shall indicate CCCH using LCID "01011", otherwise the UE shall indicate CCCH using LCID "00000". The LCID field size is 5 bits;

E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;

R: Reserved bit, set to "0".

LCID is currently defined in 3GPP TS 36.321 (for example Table 6.2.1-1 Values of LCID for DL-SCH):

| Index | LCID values |
|---|---|
| 00000 | CCCH |
| 00001 to 01010 | Identity of the logical channel |
| 01011 to 11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

The capabilities of the NB-IoT needed to be transported to the mobile communications network are rather small, but might advantageously include frequency band (1 or 2) to be supported, Layer 1 techniques (single tone/multi tone) to be used, and/or the communications device (UE) supports one or more way of data transport for the NB-IoT (compare 3GPP TR 23.720, Solution 2 and Solution 18).

The invention suggests to re-use some of the reserved values to signal capability set of the UE. The use of R bits can advantageously also be used to achieve the same goal.

In addition, it is advantageously proposed to use DL NAS Message to transport UE capabilities in case the connection last for a little bit longer time.

Figure 4:
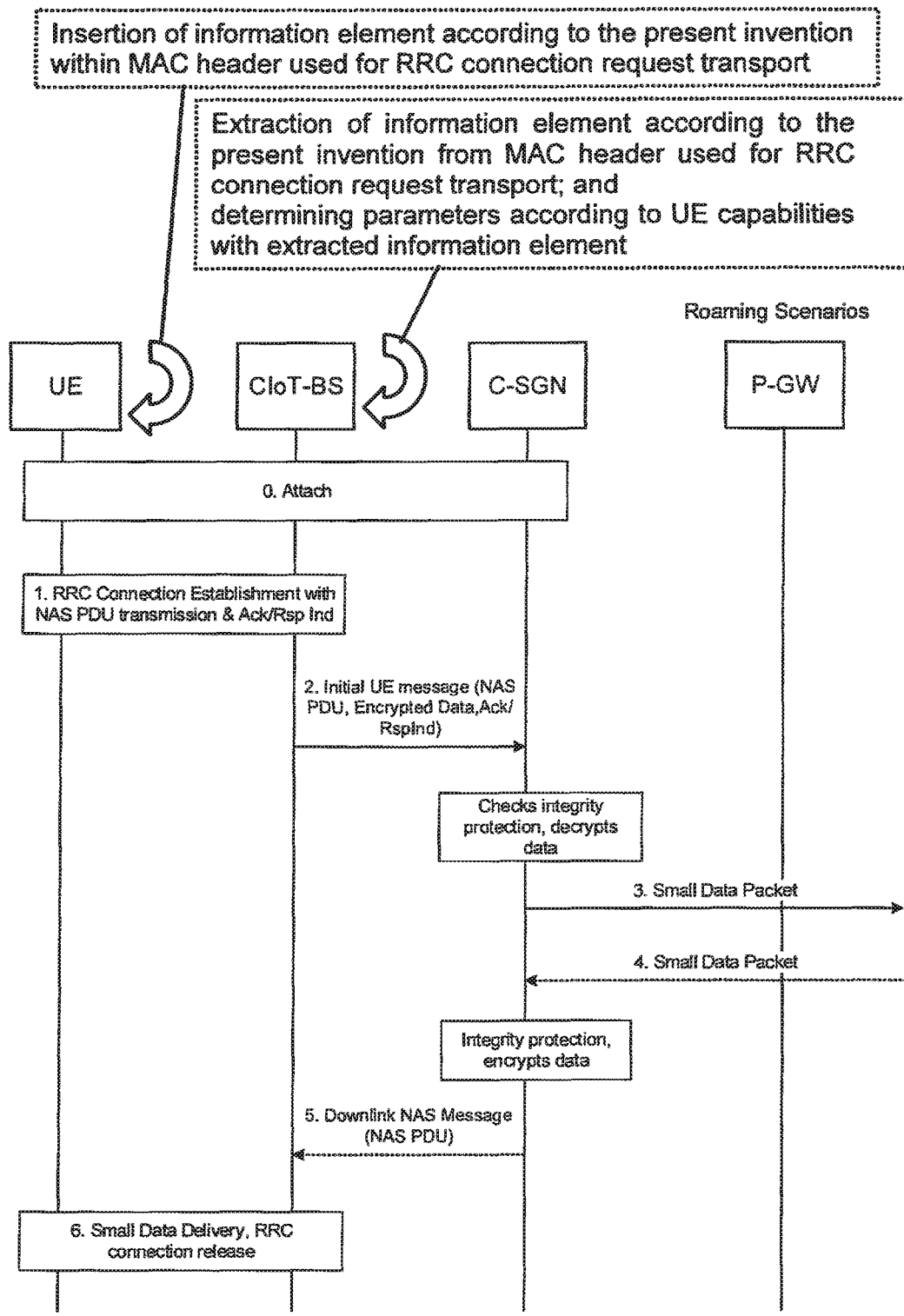
FIG. 4 shows a message flow diagram for handling the capabilities of a communications device (UE) according to a second embodiment of the present invention.

FIG. 4 shows a message flow diagram for handling the capabilities of a communications device (UE) according to a second embodiment of the present invention, which is compared with FIG. 2 modified in such a way, that the communications device (UE) during an attach procedure transmits an information element regarding radio related capabilities of the communications device (UE) and/or regarding core network capabilities of the communications device (UE) to the CIoT-BS of the mobile communications network, which is according to the present invention a network element providing a wireless access interface for the communications device (UE). The information element is transferred to the CIoT-BS of the mobile communications network with a RRC connection request, whereby the information element is inserted within the RRC connection request by the communications device (UE), by entering the information element within reserved values of the LCID of the RRC connection request.

The creation respectively generation of the information element regarding radio related capabilities of the communications device (UE) and/or regarding core network capabilities of the communications device (UE) is preferably done by the communications device (UE) out of the parameters of the capabilities of the communications device (UE), especially UE-EUTRA capabilities according to 3GPP TS 36.331, chapter 6.3.6, with PDCP parameters, RLC parameters, RF parameters and/or the like according to 3GPP TS 36.306 or by any new parameters which might be included into the existing parameter categories as listed above (e.g. Multi Tone/Single Tone Support, Support of different ways of Data transport within CIoT architecture (especially Solution/Option 2 or Solution/Option 18 according to 3GPP TR 23.720)). For this the communication device (UE) preferably comprises a logic respectively logic module or algorithm.

Thus the capabilities of the communications device (UE), especially radio related capabilities of the communications device (UE) and/or core network capabilities of the communications device (UE) are as fast as possible available and usable at the CIoT-BS providing a wireless access interface for the communications device (UE) to the mobile communications network This advantageously provides the mobile communications network, especially the CIoT-BS, a possibility to assign resources, execute admission control and/or for choice respectively selection of a core network element (for example CIoT-BS) in an improved way.

The establishment of the connection includes—as stated above—from RRC perspective three messages:
RRC CONNECTION REQUEST
RRC CONNECTION SETUP
RRC CONNECTION SETUP COMPLETE RRC CONNECTION REQUEST includes 48 bits of information. 40 bits are used for identification of the communications device (UE), like TMSI and 8 bits for cause values. RRC Connection requests uses MAC layer to be transported, so that a header of 1 octet is added as for example shown in 3GPP TS 36.321, chapter 6.1.2 (compare FIG. 5).

Singe felds are defined as follow in 3GPP TS 36.321:

LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 [12] shall indicate CCCH using LCID "01011", otherwise the UE shall indicate CCCH using LCID "00000". The LCID field size is 5 bits;

E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;

R: Reserved bit, set to "0".

LCID is currently defined in 3GPP TS 36.321 (for example Table 6.2.1-1 Values of LCID for DL-SCH):

| Index | LCID values |
| --- | --- |
| 00000 | CCCH |
| 00001 to 01010 | Identity of the logical channel |
| 01011 to 11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

The capabilities of the NB-IoT needed to be transported to the mobile communications network are rather small, but might advantageously include frequency band (1 or 2) to be supported, Layer 1 techniques (single tone/multi tone) to be used, and/or the communications device (UE) supports one or more way of data transport for the NB-IoT (compare 3GPP TR 23.720, Solution 2 and Solution 18).

The invention suggests to re-use some of the reserved values to signal capability set of the UE. The use of R bits can advantageously also be used to achieve the same goal. In addition, it is advantageously proposed to use DL NAS Message to transport UE capabilities in case the connection last for a little bit longer time.

The exemplary embodiments of the invention shown in the figures of the drawing and explained in connection with the description merely serve to explain the invention and are in no way restrictive.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims, especially with the mentioned 3GPP documents, which are all cited by reference, especially for purposes of supporting disclosure and the scope of the present invention.

In the claims, the word "comprising" or "including" does not exclude other elements or steps, and the indefinite article "a" or "an" does not exclude a plurality. A single processor or other unit or means may fulfill the functions of several items recited in the claims. Any reference signs in the claims should not be construed as limiting the scope.

What is claimed is:

1. A method of operating a communications device in a mobile communications network including one or more network elements, which are especially for providing a wireless access interface for the communications device, especially according to LTE or CIoT, the method comprising:
during an attach procedure, transmitting, by the communications device, an information element regarding radio related capabilities of the communications device to a network element of the mobile communications network providing a wireless access interface for the communications device; and
wherein the information element regarding radio related capabilities of the communications device is transferred to the network element of the mobile communications network with a RRC connection request within a MAC header used for RRC connection request transport.

2. The method according to claim 1, wherein the information element regarding radio related capabilities of the communications device is inserted within the RRC connection request by the communications device.

3. The method according to claim 1, wherein the information element is inserted within MAC header used for RRC connection request transport.

4. The method according to claim 2, wherein the information element regarding radio related capabilities of the communications device of the communications device is entered within reserved values of the LCID of the RRC connection request.

5. A method of operating a communications device in a mobile communications network including one or more network elements, which are especially for providing a wireless access interface for the communications device, especially according to LTE or CIoT, the method comprising:
during an attach procedure, receiving, by a network element of the mobile communications network providing a wireless access interface for the communications device, the information element regarding radio related capabilities of the communications device and whereby the network element of the mobile communications network is able to use the received information element regarding radio related capabilities of the communications device itself, for selecting a core network node of the mobile communications network, wherein the information element regarding radio related capabilities of the communications device is received by the network element of the mobile communications network with a RRC connection request.

6. The method according to claim 5, wherein the information element regarding radio related capabilities of the communications device is contained within the received RRC connection request.

7. The method according to claim 6, wherein the information element is contained within MAC header used for RRC connection request transport.

8. The method according to claim 6, wherein the information element regarding radio related capabilities of the communications device is extracted by the network element of the mobile communications network from respectively out of the received RRC connection request.

9. The method according to claim 7, wherein the information element regarding radio related capabilities of the communications device is extracted by the network element of the mobile communications network from respectively out of the received RRC connection request, from respectively out of the received MAC header used for RRC connection request transport.

10. The method according to claim 9, wherein the information element is extracted out of reserved values of the LCID of the RRC connection request.

11. A mobile communications system for operating a communications device in a mobile communications network including one or more network elements, which are especially for providing a wireless access interface for the communications device, especially according to LTE or CIoT, wherein the communications device is adapted to perform a method comprising:
during an attach procedure, transmitting an information element regarding radio related capabilities of the communications device to a network element of the mobile communications network providing a wireless access interface for the communications device; and wherein a network element of the mobile communications network providing a wireless access interface for the communications device is adapted to perform a method comprising:

during an attach procedure, receiving an information element regarding radio related capabilities of the communications device and whereby the network element of the mobile communications network is able to use the received information element regarding radio related capabilities of the communications device itself, for selecting a core network node of the mobile communications network, wherein the information element is generated by the communications device using parameters of capabilities of the communications device, the parameters of capabilities of the communications device comprising PDCP parameters, RLC parameters, RF parameters, and/or physical layer parameters for purposes of Multi Tone support or Single Tone support.

12. A communications device for being operated in a in a mobile communications network including one or more network elements, which are especially for providing a wireless access interface for the communications device, especially according to LTE or CIoT, which is adapted to perform a method comprising:

generating, by the communications device, an information element using parameters of capabilities of the communications device, the parameters of capabilities of the communications device comprising PDCP parameters, RLC parameters, RF parameters, and/or physical layer parameters, for purposes of Multi Tone support or Single Tone support; and during an attach procedure, transmitting the information element regarding radio related capabilities of the communications device to a network element of the mobile communications network providing a wireless access interface for the communications device.

13. A mobile communications network including one or more network elements, which are especially for providing a wireless access interface for a communications device, especially according to LTE or CIoT, whereby a network element of the mobile communications network providing a wireless access interface for the communications device is adapted to perform a method comprising:

generating, by the communications device, an information element using parameters of capabilities of the communications device, the parameters of capabilities of the communications device comprising PDCP parameters, RLC parameters, RF parameters, and/or physical layer parameters for purposes of Multi Tone support or Single Tone support, during an attach procedure, receiving the information element regarding radio related capabilities of the communications device and whereby the network element of the mobile communications network is able to use the received information element regarding radio related capabilities of the communications device itself, for selecting a core network node of the mobile communications network.

14. A network element of a mobile communications network providing a wireless access interface for a communications device, especially according to LTE or CIoT, which is adapted to perform a method comprising:

during an attach procedure, receiving an information element regarding radio related capabilities of the communications device and whereby the network element of the mobile communications network is able to use the received information element regarding radio related capabilities of the communications device itself, for selecting a core network node of the mobile communications network, wherein the information element is generated by the communications device using parameters of capabilities of the communications device, the parameters of capabilities of the communications device comprising PDCP parameters, RLC parameters, RF parameters, and/or physical layer parameters, for purposes of Multi Tone support or Single Tone support.

* * * * *